US008504561B2

(12) United States Patent
Hoad et al.

(10) Patent No.: US 8,504,561 B2
(45) Date of Patent: Aug. 6, 2013

(54) USING DOMAIN INTENT TO PROVIDE MORE SEARCH RESULTS THAT CORRESPOND TO A DOMAIN

(75) Inventors: Timothy C. Hoad, Redmond, WA (US); Deepak Vijaywargi, Seattle, WA (US); Yatharth Saraf, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/224,961

(22) Filed: Sep. 2, 2011

(65) Prior Publication Data

US 2013/0060761 A1 Mar. 7, 2013

(51) Int. Cl.
*G06F 17/30* (2006.01)

(52) U.S. Cl.
USPC ............ 707/723; 707/750; 707/766; 707/769

(58) Field of Classification Search
USPC .................. 707/723, 750, 766, 769
See application file for complete search history.

(56) References Cited

U.S. PATENT DOCUMENTS

| | | | | |
|---|---|---|---|---|
| 5,924,090 | A | 7/1999 | Krellenstein | |
| 7,519,588 | B2 * | 4/2009 | Mason | 1/1 |
| 7,761,464 | B2 * | 7/2010 | Radlinski et al. | 707/769 |
| 7,949,672 | B2 * | 5/2011 | Zhang et al. | 707/767 |
| 8,041,596 | B2 * | 10/2011 | Graham et al. | 705/7.29 |
| 8,145,636 | B1 * | 3/2012 | Jeh et al. | 707/736 |
| 8,209,349 | B2 * | 6/2012 | Howes et al. | 707/769 |
| 2007/0250468 | A1 * | 10/2007 | Pieper | 707/1 |
| 2007/0250501 | A1 * | 10/2007 | Grubb et al. | 707/5 |
| 2008/0065440 | A1 * | 3/2008 | Graham et al. | 705/7 |
| 2008/0091546 | A1 | 4/2008 | Kirovski et al. | |
| 2008/0250026 | A1 * | 10/2008 | Linden et al. | 707/10 |
| 2008/0273435 | A1 | 11/2008 | Kirovski et al. | |
| 2008/0294602 | A1 * | 11/2008 | Permandla et al. | 707/3 |
| 2009/0043721 | A1 * | 2/2009 | Reznik et al. | 706/20 |
| 2009/0064007 | A1 | 3/2009 | Lazier et al. | |

(Continued)

FOREIGN PATENT DOCUMENTS

CN 102163217 A 8/2011

OTHER PUBLICATIONS

Li, et al., "Learning Query Intent from Regularized Click Graphs", Retrieved at <<http://research.microsoft.com/pubs/75219/sigir2008.pdf>>, Proceedings of the 31st annual international ACM SIGIR conference on Research and development in information retrieval, Jul. 20-24, 2008, pp. 339-346.

(Continued)

*Primary Examiner* — Thanh-Ha Dang

(57) ABSTRACT

Techniques are described herein for using intent to access a domain (i.e., domain intent) to provide more search results that correspond to the domain. For example, a rule may specify a maximum number of search results that are allowed to be provided from a domain (or a host that corresponds to the domain) in response to a search query. Each search query may include any number of ngrams. An ngram is a subsequence of elements in a sequence (e.g., a search query). An intent to access a domain may be determined based on one or more of the ngrams in a search query. A number of search results that correspond to a domain may be increased to be greater than the maximum number based on one or more of the ngrams that are included in the search query being associated with the intent to access the domain.

20 Claims, 6 Drawing Sheets

U.S. PATENT DOCUMENTS

| | | | |
|---|---|---|---|
| 2009/0138362 A1* | 5/2009 | Schroedl et al. | 705/14 |
| 2009/0150784 A1 | 6/2009 | Denney et al. | |
| 2009/0240683 A1 | 9/2009 | Lazier et al. | |
| 2009/0327236 A1 | 12/2009 | Denney et al. | |
| 2010/0114879 A1* | 5/2010 | Zhong et al. | 707/723 |
| 2010/0138411 A1* | 6/2010 | Judy et al. | 707/723 |
| 2010/0198834 A1* | 8/2010 | Petras et al. | 707/741 |
| 2010/0198857 A1 | 8/2010 | Metzler et al. | |
| 2010/0312782 A1* | 12/2010 | Li et al. | 707/769 |
| 2010/0324901 A1* | 12/2010 | Carter et al. | 704/255 |
| 2011/0040769 A1* | 2/2011 | Tseng et al. | 707/750 |
| 2011/0173569 A1* | 7/2011 | Howes et al. | 715/835 |
| 2011/0213761 A1* | 9/2011 | Song et al. | 707/706 |
| 2011/0225152 A1 | 9/2011 | Beaudreau et al. | |
| 2011/0307482 A1* | 12/2011 | Radlinski et al. | 707/731 |
| 2011/0307483 A1* | 12/2011 | Radlinski et al. | 707/731 |
| 2012/0059838 A1 | 3/2012 | Berntson et al. | |
| 2013/0054587 A1 | 2/2013 | Ahari et al. | |

OTHER PUBLICATIONS

Tseng, et al., "Mining Search Engine Clickthrough Log for Matching N-gram Features", Retrieved at <<http://delivery.acm.org/10.1145/1700000/1699581/p524-tseng.pdf?>>, Proceedings of the 2009 Conference on Empirical Methods in Natural Language Processing, vol. 2, Aug. 6-7, 2009, pp. 524-533.

Ganti, et al., "Precomputing Search Features for Fast and Accurate Query Classification", Retrieved at <<http://www.wsdm-conference.org/2010/proceedings/docs/p61.pdf>>, Proceedings of the third ACM international conference on Web search and data mining, Feb. 3-6, 2010, pp. 61-70.

* cited by examiner

USING DOMAIN INTENT TO PROVIDE MORE SEARCH RESULTS THAT CORRESPOND TO A DOMAIN

BACKGROUND

A search engine is a type of program that may be hosted and executed by a server. A server may execute a search engine to enable users to search for documents in a networked computer system based on search queries that are provided by the users. For instance, the server may match search terms (e.g., keywords) that are included in a user's search query to metadata associated with documents that are stored in (or otherwise accessible to) the networked computer system. Documents that are retrieved in response to the search query are provided to the user as respective search results. The documents are often ranked based on how closely their metadata matches the search terms. For example, the documents may be listed in an order that corresponds to the rankings of the respective documents. The document having the highest ranking is usually listed first in the search results.

Search engines traditionally are configured to restrict a number of search results that are allowed to appear from each domain or host to no greater than a maximum number in order to maintain diversity among the search results. Some search queries may indicate a relatively strong intent to obtain search results from particular domains or hosts. For instance, the search query "music videos youtube" may indicate a relatively strong intent to obtain search results corresponding to music videos from YouTube®. However, even when a search query indicates a relatively strong intent with regard to a domain or host, conventional search engines continue to limit the number of search results that are provided from that domain or host to be no greater than the maximum number.

Conventional search engines may be capable of recognizing operators in a search query that are intended to increase relevance of search results that are provided in response to the search query. For example, a "site:" operator may be included in a search query to indicate that corresponding search results are to be retrieved from only a specified web site. However, the use of such operators by a user requires the user to have knowledge of the operators and to configure a search query to incorporate the operators, which may be inconvenient.

SUMMARY

Various approaches are described herein for, among other things, using intent to access a domain (i.e., domain intent) to provide more search results that correspond to the domain. For example, a rule may specify a maximum number of search results that are allowed to be provided from a domain (or a host that corresponds to the domain) in response to a search query. Each search query may include any number of ngrams. An ngram is a subsequence of n elements in a sequence (e.g., a search query). Each of the n elements may be a phoneme, a syllable, a character (e.g., letter or number), a word, etc. An intent to access a domain may be determined based on one or more of the ngrams in a search query.

For example, the domain intent of a received search query may be determined based on historical click data regarding subsets of search queries, which include respective ngrams of the received search query. In accordance with this example, if clicks that occur with respect to the search queries that include a specified ngram of the received search query correspond to a first domain to an extent that exceeds a threshold, the ngram and first domain pair may be said to be associated with an intent to access the first domain. A number of search results that correspond to a domain may be increased to be greater than the maximum number based on one or more of the ngrams that are included in the search query being associated with the intent to access the domain.

An example method is described. In accordance with this method, for each ngram of a plurality of ngrams, a click entropy is determined that represents an extent to which clicks that occur with respect to search queries that include the ngram are diversified among domains based on a proportion of the clicks that corresponds to each domain. The click entropy for each ngram is compared to an entropy threshold to determine a subset of the ngrams such that the click entropy of each ngram in the subset is less than the entropy threshold. A determination is made that each ngram in the subset is associated with an intent to access a respective designated domain. The designated domain for each ngram in the subset corresponds to a relatively greater proportion of the clicks that occur with respect to the search queries that include that ngram than others of the domains. A number of search results that correspond to the designated domain for a specified ngram from the subset that are to be provided in response to receipt of a search query that includes the specified ngram is increased to be greater than a specified maximum number.

Another example method is described. In accordance with this method, for each ngram of a plurality of ngrams, a domain click value is determined that represents a proportion of clicks, which occur with respect to search queries that include the ngram, that corresponds to a designated domain. The domain click value for each ngram is compared to a threshold value to determine a subset of the ngrams such that the domain click value of each ngram in the subset is greater than the threshold value. A number of search results that correspond to the designated domain that are to be provided in response to receipt of a search query that includes a specified ngram from the subset is increased to be greater than a specified maximum number.

Yet another example method is described. In accordance with this method, a rule is established that specifies a maximum number of search results that are to be provided from each of a plurality of domains in response to an arbitrary search query. A number of search results that are to be provided from a specified domain of the plurality of domains in response to a specified search query is increased to be greater than the maximum number based on the specified search query including an ngram that is identified to be associated with an intent to access the specified domain.

An example system is described that includes value determination logic, comparison logic, intent determination logic, and result provision logic. The value determination logic is configured to determine, for each ngram of a plurality of ngrams, a click entropy that represents an extent to which clicks that occur with respect to search queries that include the ngram are diversified among domains based on a proportion of the clicks that corresponds to each domain. The comparison logic is configured to compare the click entropy for each ngram to an entropy threshold to determine a subset of the ngrams such that the click entropy of each ngram in the subset is less than the entropy threshold. The intent determination logic is configured to determine that each ngram in the subset is associated with an intent to access a respective designated domain. The designated domain for each ngram in the subset corresponds to a relatively greater proportion of the clicks that occur with respect to the search queries that include that ngram than others of the domains. The result provision logic is configured to increase a number of search results that correspond to the designated domain for a specified ngram from the subset that are to be provided in response to receipt of a search query that includes the specified ngram to be greater than a specified maximum number.

Another example system is described that includes value determination logic, comparison logic, intent determination logic, and result provision logic. The value determination logic is configured to determine, for each ngram of a plurality of ngrams, a domain click value that represents a proportion of clicks, which occur with respect to search queries that include the ngram, that corresponds to a designated domain. The comparison logic is configured to compare the domain click value for each ngram to a threshold value to determine a subset of the ngrams such that the domain click value of each ngram in the subset is greater than the threshold value. The intent determination logic is configured to determine that each ngram in the subset is associated with an intent to access the designated domain based on the domain click value for each ngram in the subset being greater than the threshold value. The result provision logic is configured to increase a number of search results that correspond to the designated domain that are to be provided in response to receipt of a search query that includes a specified ngram from the subset to be greater than a specified maximum number.

Yet another example system is described. This system includes rule logic and result provision logic. The rule logic is configured to establish a rule that specifies a maximum number of search results that are to be provided from each of a plurality of domains in response to an arbitrary search query. The result provision logic is configured to dynamically increase a number of search results that are to be provided from a specified domain of the plurality of domains in response to a specified search query to be greater than the maximum number based on the specified search query including an ngram that is identified to be associated with an intent to access the specified domain.

This Summary is provided to introduce a selection of concepts in a simplified form that are further described below in the Detailed Description. This Summary is not intended to identify key features or essential features of the claimed subject matter, nor is it intended, to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
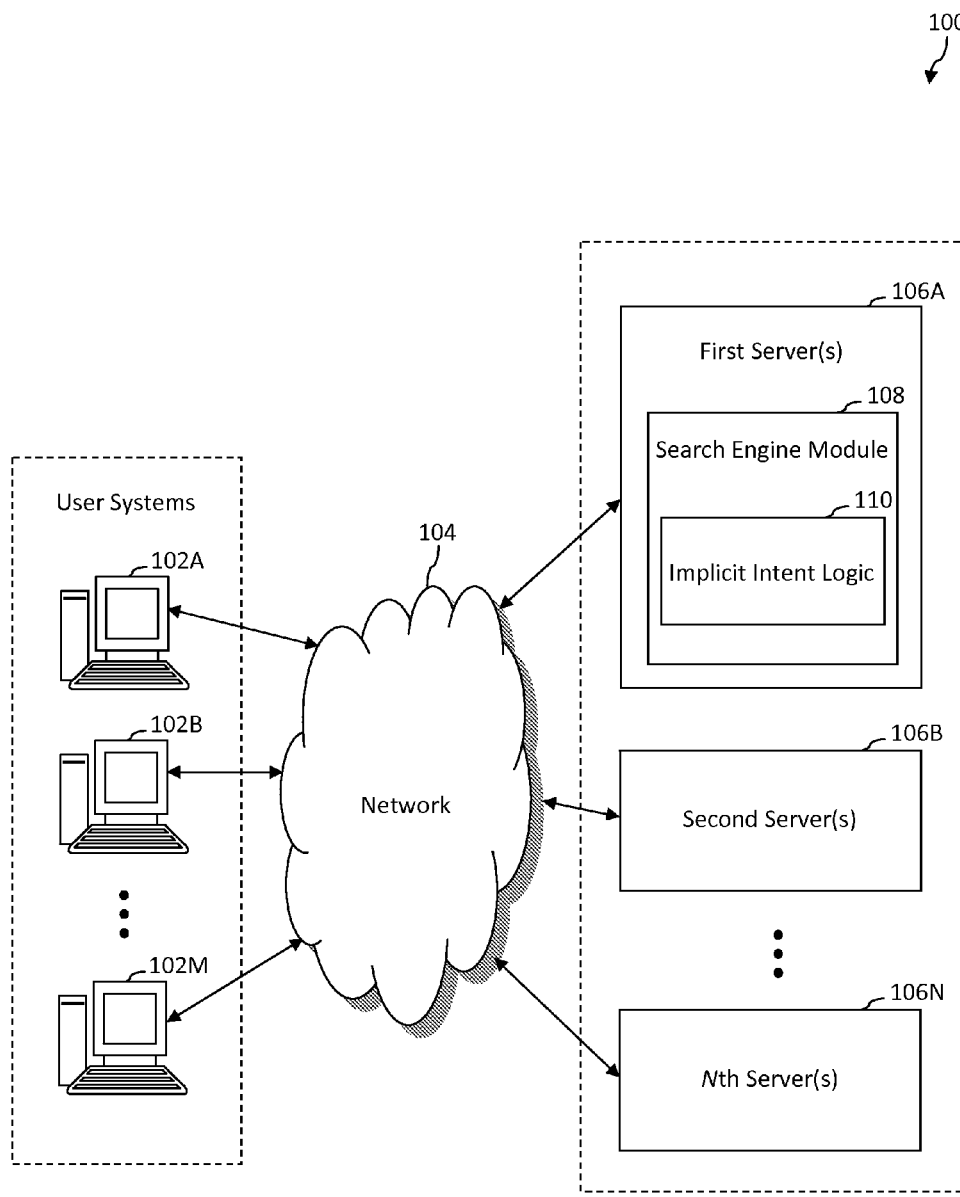
FIG. 1 is a block diagram of an example computer system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated, embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

The discussion herein makes continued references to domains and domain intent (i.e., intent to access a domain) for illustrative purposes and is not intended to be limiting. It will be recognized that example embodiments described herein are also applicable to hosts and host intent (i.e., intent to access a host). For example, references to "domain" may be replaced with "host", and references to "domain intent" may be replaced with "host intent". For purposes of illustration, news.google.com is referred to as a host; whereas, google.com is the domain of the aforementioned host.

II. Example Embodiments for Using Domain Intent to Provide More Search Results that Correspond to a Domain Example embodiments described herein are capable of using intent to access a domain (i.e., domain intent) to provide more search results that correspond to the domain. For example, a rule may specify a maximum number of search results that are allowed to be provided from a domain (or a host that corresponds to the domain) in response to a search query. Each search query may be divided into ngrams. An ngram is a subsequence of n elements in a sequence (e.g., a search query). Each of the n elements may be a phoneme, a syllable, a character (e.g., letter or number), a word, etc. It will be recognized that n may be any positive integer (e.g., 1, 2, 3, 4, etc.). For instance, an ngram for which n=1 is referred to as a unigram; an ngram for which n=2 is referred to as a bigram; an ngram for which n=3 is referred to as a trigram, and so on. An intent to access a domain may be determined based on one or more of the ngrams in a search query.

For example, the domain intent of a received search query may be determined based on historical click data regarding subsets of search queries, which include respective ngrams of the received search query. In accordance with this example, if clicks that occur with respect to the search queries that include a specified ngram of the received search query correspond to a first domain to an extent that exceeds a threshold, the first domain may be said to be associated with an intent to access the first domain (i.e., a domain intent regarding the first domain). A number of search results that correspond to a domain may be increased to be greater than the maximum number based on one or more of the ngrams that are included in the search query being associated with the intent to access the domain.

Example techniques described herein have a variety of benefits as compared to conventional techniques for providing search results. For example, the techniques described herein may dynamically allow more search results to be provided from a domain than a specified maximum number based on ngram(s) in a search query upon which the search results are based indicating an intent to access the domain. The techniques may classify relatively strong domain intent for ngrams based on click entropy. The techniques may group search results from a domain together based on a number of the search results that are retrieved from the domain in response to a corresponding search query. A user need not necessarily configure a search query to incorporate operators in order to increase relevance of the search results. For example, the techniques may determine domain intent implicitly. In accordance with this example, the techniques may increase satisfaction of the user and/or relevance of the search results with no additional effort by the user, as compared to conventional techniques for providing search results.

FIG. 1 is a block diagram of an example computer system 100 in accordance with an embodiment. Generally speaking, computer system 100 operates to provide information to users in response to requests (e.g., hypertext transfer protocol (HTTP) requests) that are received from the users. The information may include documents (e.g., Web pages, images, video files, etc.), output of executables, and/or any other suitable type of information. For instance, user system 100 may provide search results in response to search queries that are provided by users. According to example embodiments, computer system 100 operates to use intent to access a domain (i.e., domain intent) to provide more search results that correspond to the domain. Further detail regarding techniques for using domain intent for providing search results is provided, in the following discussion.

As shown in FIG. 1, computer system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for information using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 106A-106N, so that user systems 102A-102M may access information that is available via the Web sites. Such Web sites include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a desktop computer, a laptop computer, a tablet computer, a personal digital assistant, a cellular telephone, or the like.

Servers 106A-106N are processing systems that are capable of communicating with user systems 102A-102M. Servers 106A-106N are configured to execute software programs that provide information to users in response to receiving requests from the users. For example, the information may include documents (e.g., Web pages, images, video files, etc.), output of executables, or any other suitable type of information. In accordance with some example embodiments, servers 106A-106N are configured to host respective Web sites, so that the Web sites are accessible to users of computer system 100.

One type of software program that may be executed by any one or more of servers 106A-106N is a search engine. A search engine is executed by a server to search for information in a networked computer system based on search queries that are provided by users. First server(s) 106A is shown to include search engine module 108 for illustrative purposes. Search engine module 108 is configured to execute a search engine. For instance, search engine module 108 may search among servers 106A-106N for requested information. Upon determining instances of information that are relevant to a user's search query, search engine module 108 provides the instances of the information as search results to the user. Search engine module 108 may rank the search results based on their relevance to the search query. For instance, search engine module 108 may list the search results in an order that is based on their respective rankings.

Search engine module 108 includes implicit intent logic 110. Implicit intent logic 110 is configured to use intent to access a domain (i.e., domain intent) to provide more search results that correspond to the domain. For example, a rule may specify that no more than a specified (e.g., predetermined) maximum number of search results are allowed to be provided from each domain (or host that corresponds to the domain) in response to each search query. The specified maximum number may be any suitable positive integer (e.g., 1, 2, 3, 4, etc). Implicit intent logic 110 determines whether ngrams indicate intent to access domains based on proportions of clicks, which occur with respect to search queries that include the ngrams, that correspond to the domains. A click is a selection of a search result that corresponds to a domain in response to a search query upon which the search result is based.

In some example embodiments, a click entropy is determined for each ngram. A click entropy for an ngram represents an extent to which clicks that occur with respect to search queries that include the ngram are diversified among domains. A relatively high click entropy may indicate that no particular domain is intended to be accessed by search queries that include the ngram. A relatively low click entropy may indicate an intent for search queries that include the ngram to be navigational. For example, the relatively low click entropy for the ngram may indicate an intent to access a particular domain that corresponds to a relatively greater proportion of the clicks for the ngram than other domains. In accordance with this example, a number of search results that correspond to the particular domain that are to be provided in response to a search query that includes the ngram may be increased to be greater than the specified maximum number.

In other example embodiments, domain click value(s) are determined for each ngram. A domain click value for an ngram represents a proportion of clicks that occur with respect to search queries that include the ngram that correspond to a domain. For instance, an ngram of "burg" may have a domain click value of 17% for fuddruckers.com, a domain click value of 5% for whataburger.com, a domain click value of 7% for redrobin.com, and so on. A relatively low domain click value for a domain with regard to an ngram may indicate that no intent to access the domain is to be inferred from search queries that include the ngram. A relatively high domain click value may indicate an intent for search queries that include the ngram to be navigational. For example, a relatively high domain click value for a domain with regard to an ngram may indicate that an intent to access the domain is to be inferred from search queries that include the ngram. In accordance with this example, a number of search results that correspond to the domain that are to be provided in response to a search query that includes the ngram may be increased to be greater than the specified maximum number.

It will be recognized that implicit intent logic 110 may be implemented in various ways to use intent to access a domain to provide more search results that correspond to the domain, including being implemented in hardware, software, firmware, or any combination thereof. For example, implicit intent logic 110 may be implemented as computer program code configured to be executed in one or more processors. In another example, implicit intent logic 110 may be implemented as hardware logic/electrical circuitry. In an embodiment, implicit intent logic 110 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Some example techniques for using domain intent to provide more search results that correspond to a domain are discussed in greater detail below with reference to FIGS. 2-5.

Figure 2:
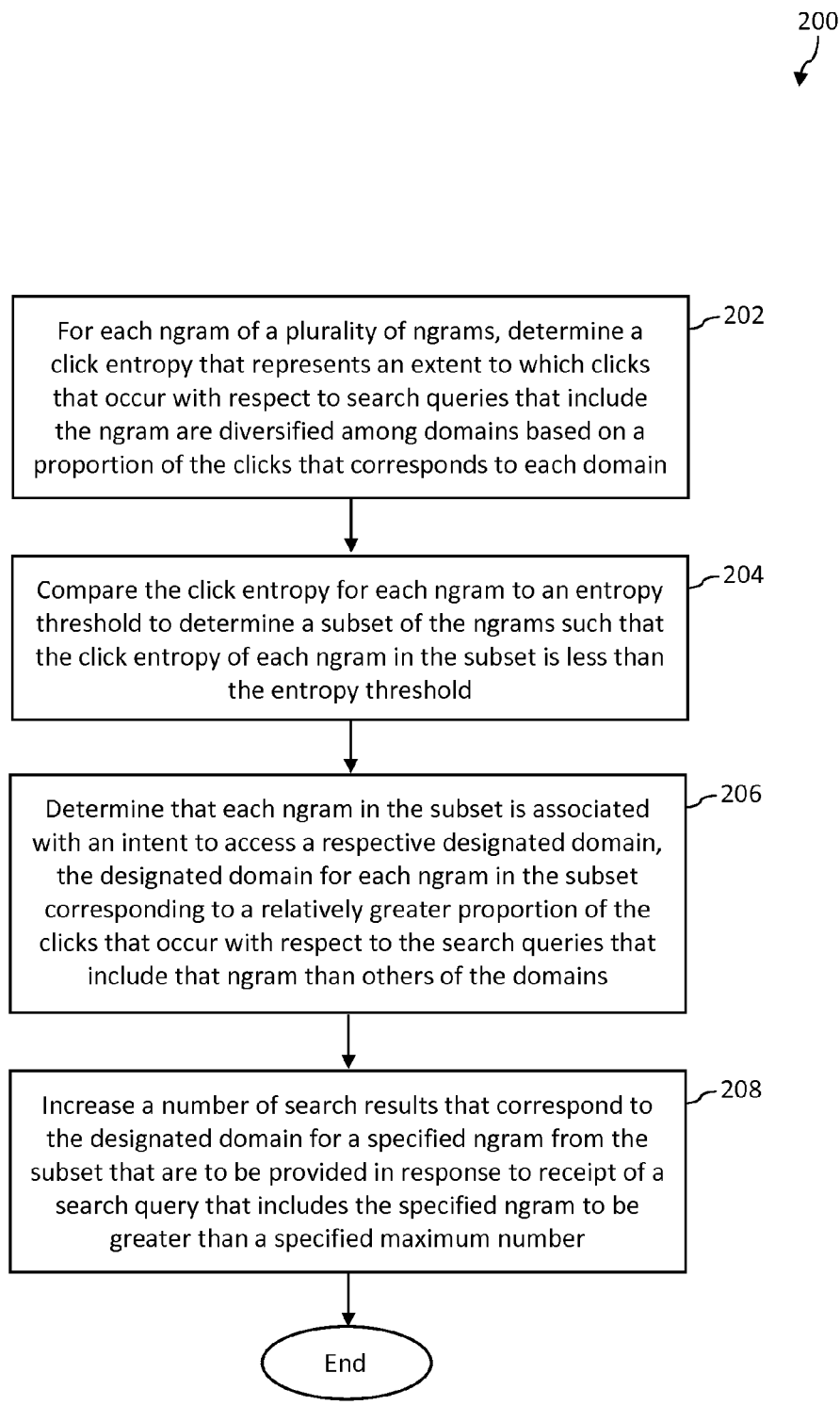
FIGS. 2-4 depict flowcharts of methods for using domain intent to provide more search results that correspond to a domain in accordance with embodiments.
Figure 3:
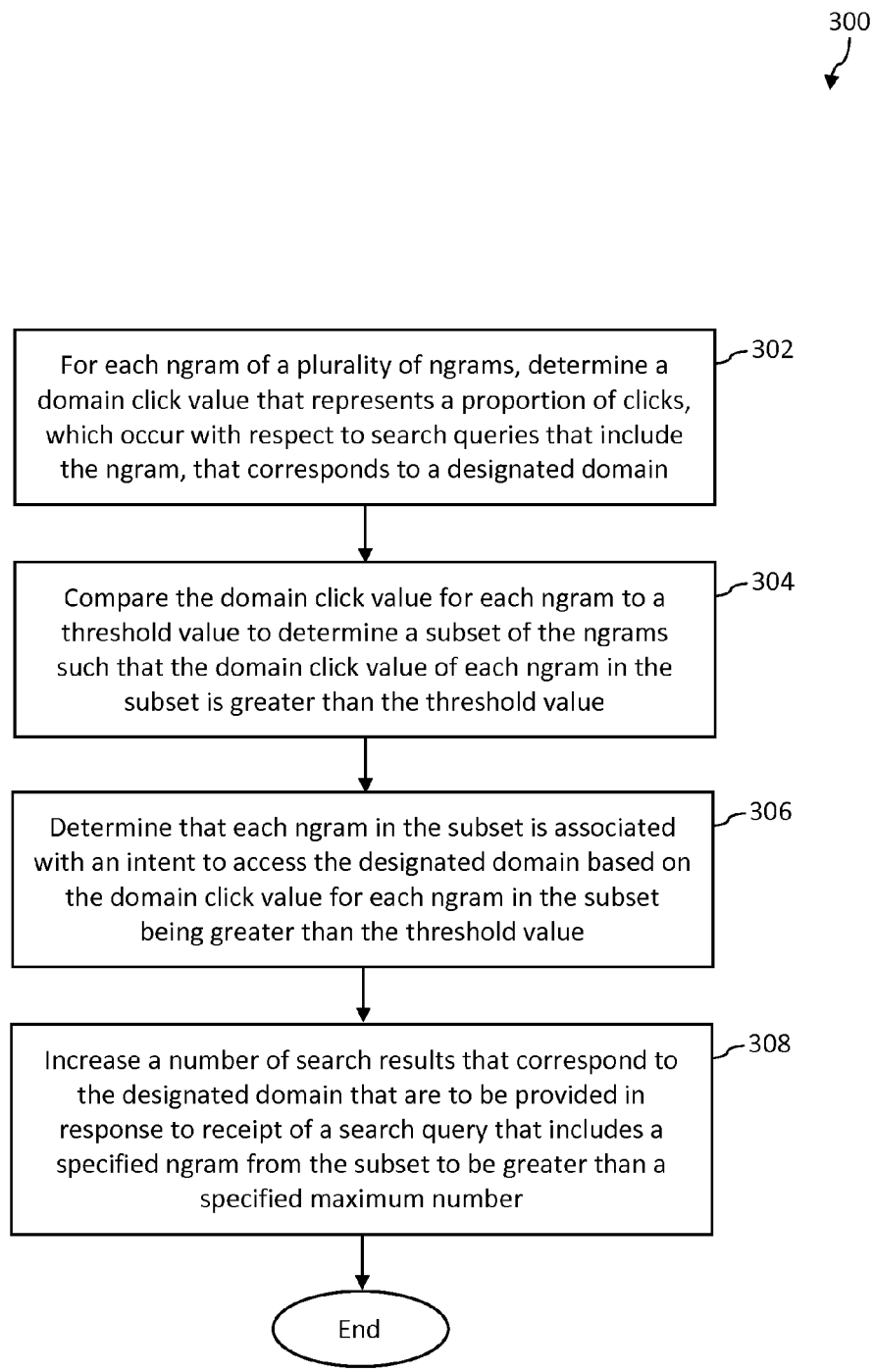
Figure 4:
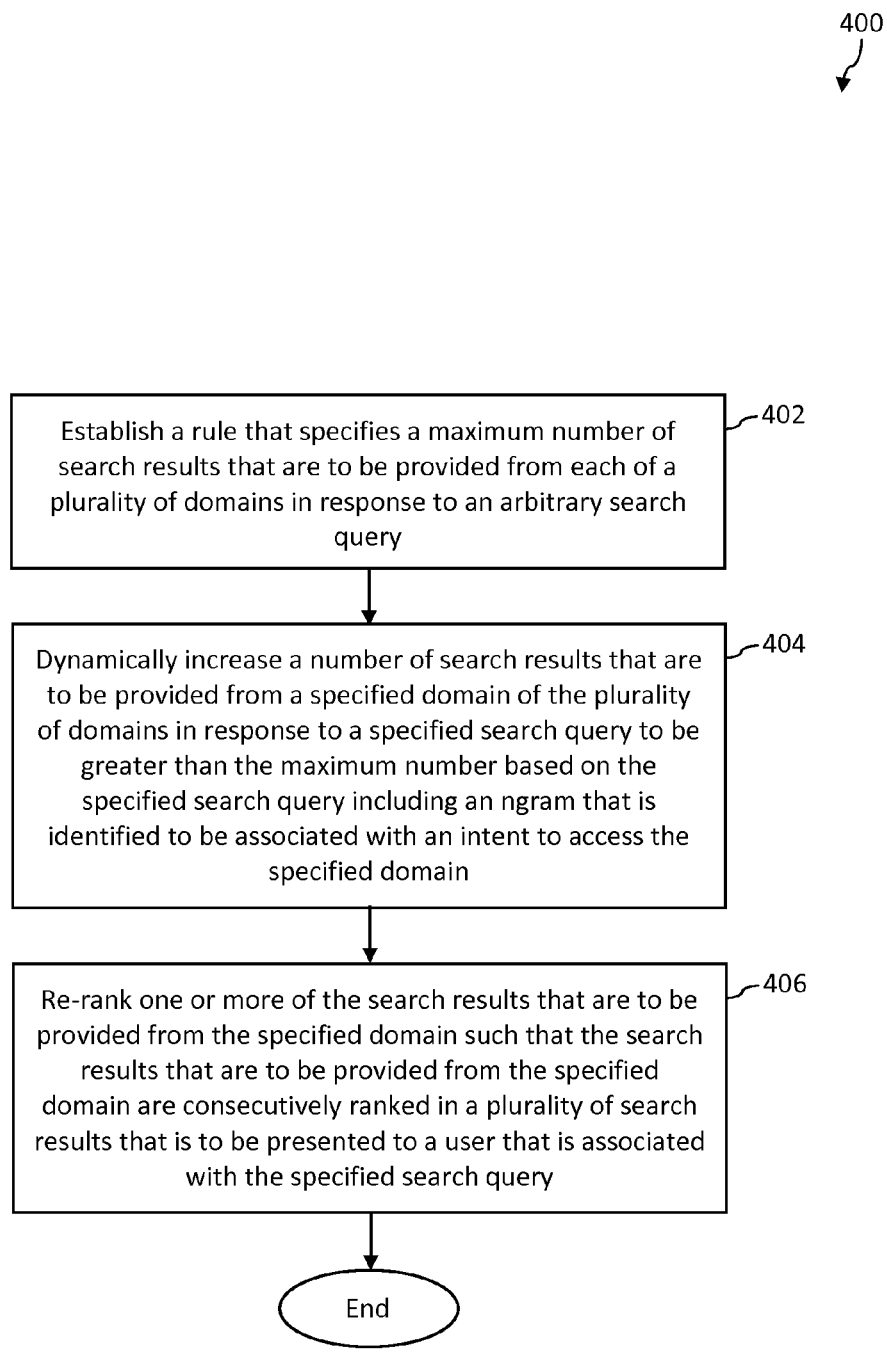
Figure 5:
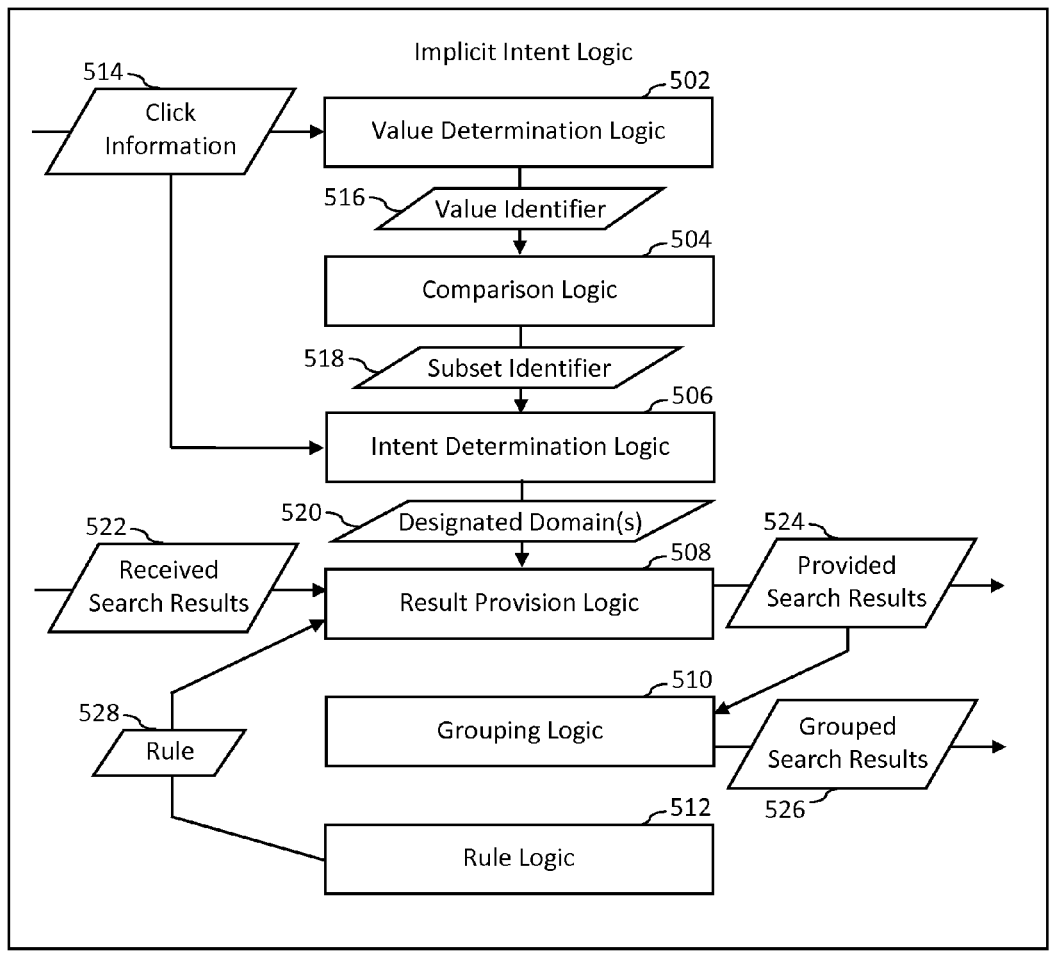
FIG. 5 is a block diagram of an example implementation of implicit intent logic shown in FIG. 1 in accordance with an embodiment.

FIGS. 2-4 depict flowcharts 200, 300, and 400 of methods for using domain intent to provide more search results that correspond to a domain in accordance with embodiments. Flowcharts 200, 300, and 400 may be performed by implicit intent logic 110 of computer system 100 shown in FIG. 1, for example. For illustrative purposes, flowcharts 200, 300, and 400 are described with respect to implicit intent logic 500 shown in FIG. 5, which is an example of implicit intent logic 110, according to an embodiment. As shown in FIG. 5, implicit intent logic 500 includes value determination logic 502, comparison logic 504, intent determination logic 506, result provision logic 508, grouping logic 510, and rule logic 512. Further structural and operational embodiments will be apparent to persons skilled, in the relevant art(s) based on the discussion regarding flowcharts 200, 300, and 400. Flowcharts 200, 300, and 400 are described as follows.

As shown in FIG. 2, the method of flowchart 200 begins at step 202. In step 202, for each ngram of a plurality of ngrams, a click entropy is determined that represents an extent to which clicks that occur with respect to search queries that include the ngram are diversified among domains based on a proportion of the clicks that corresponds to each domain. The click entropy for each ngram may be based on historical click data, though the scope of the example embodiments is not limited in this respect. Historical click data for an ngram indicates a number of clicks that occur with respect to search queries that include that ngram during a designated historical period of time for each domain. The plurality of ngrams may include unigram(s), bigram(s), trigram(s), etc. or any combination thereof. In an example implementation, value determination logic 502 determines the click entropy for each ngram. In accordance with this implementation, value determination logic 502 may generate and/or provide a value identifier 516 that includes the click entropy for each ngram based on click information 514. Click information 514 may indicate the proportion and/or number of the clicks that corresponds to each domain, a number of the domains among which the clicks are distributed, a cumulative number of the clicks that are distributed among the domains, etc. for each ngram.

In an example embodiment, the click entropy for each ngram is based on a summation of values for that ngram. Each value is based on a logarithmic function of the respective proportion of the clicks that occurs with respect to the search queries that include the ngram that corresponds to the respective domain. For instance, the summation of the values for each ngram may be represented by the following equation:

$$CE = \sum_{i=1}^{N} -p*\log_2(p) \qquad \text{Equation 1}$$

where CE represents the click entropy for the ngram; N represents a number of the domains; and p represents a proportion of the clicks that occurs with respect to the search queries that include the ngram for each domain. In accordance with this embodiment, the entropy threshold may be any suitable value (e.g., 1.05, 1.2, 1.325, etc.). In an example implementation, value determination logic 502 sums the values for each ngram to generate the respective click entropy.

At step 204, the click entropy for each ngram is compared to an entropy threshold to determine a subset of the ngrams such that the click entropy of each ngram in the subset is less than the entropy threshold. In an example implementation, comparison logic 504 compares the click entropy for each ngram to the entropy threshold to determine the subset of the ngrams. In accordance with this implementation, comparison logic 504 may generate and/or provide a subset identifier 518, which includes information regarding the subset. For example, the subset identifier 518 may identify the ngrams that are included in the subset. In another example, the subset identifier 518 may indicate the click entropies for the respective ngrams in the subset.

At step 206, a determination is made that each ngram in the subset is associated with an intent to access a respective designated domain. Accordingly, a determination may be made that search queries that include an ngram from the subset are navigational with respect to the designated domain that corresponds to the ngram. The determination that each ngram in the subset is associated with the intent to access the respective designated domain may be implicitly made, though the scope of the example embodiments is not limited in this respect. The designated domain for each ngram in the subset corresponds to a relatively greater proportion of the clicks that occur with respect to the search queries that include that ngram than others of the domains. In an example implementation, intent determination logic 506 determines that the ngrams in the subset are associated with intents to access respective designated domain(s) 520. In accordance with this implementation, intent determination logic 506 determines that the ngrams in the subset are associated with the respective intents based on the click information 514 and the subset identifier 518. For example, intent determination logic 506 may determine the designated domain(s) 520 for the ngrams in the subset based on the click information 514 indicating the proportion of the clicks that corresponds to each domain for each ngram, and further based on the subset identifier 518 identifying the ngrams that are included in the subset.

At step 208, a number of search results that correspond to (e.g., that are received from) the designated domain for a specified ngram from the subset that are to be provided in response to receipt of a search query that includes the specified ngram is increased to be greater than a specified maximum number. For instance, the number of the aforementioned search results may be dynamically increased to be greater than the specified maximum number. The specified maximum number may be a predetermined maximum number (e.g., a maximum number that is determined prior to receipt of the search query upon which the search results are based), though the scope of the example embodiments is not limited in this respect. The specified ngram may be any suitable ngram from the subset. In an example implementation, result provision logic 508 increases a number of received search results 522 that correspond to the designated domain for the specified ngram that are to be included in provided search results 524. For instance, result provision logic 508 may select the provided search results 524 from the received search results 522 to include more than the specified maximum number of search results that correspond to the designated domain for the specified ngram for presentation to a user who initiates the search query.

In an example embodiment, step 208 includes increasing the number of the search results that correspond to the designated domain for the specified ngram that are to be provided in response to receipt of the search query to be a specified number that is selected based on the click entropy for the specified ngram. For instance, the specified number may be selected based on the following equation:

$$SNum=A*entropy+B \qquad \text{Equation 2}$$

In Equation 2, SNum represents the specified number (or an approximation thereof), and A and B are constants. SNum may not be an integer. Accordingly, SNum may be rounded or truncated to provide an integer that represents the specified number. A and B may be any suitable respective values. In one example, A=−2.5 and B=7. The specified number may be limited to a range, though the scope of the example embodiments is not limited in this respect. For example, the specified number may be limited to a range from two to seven. In accordance with this example, if SNum>7, the specified number may be selected to be seven, which is a highest value in the range.

In an example implementation, value determination logic 502 selects the specified number based on the click entropy for the specified ngram. For instance, value determination logic 502 may review the click information 514 to determine the click entropy for the specified ngram. Value determination logic 502 may include the specified number in value identifier 516. Result provision logic 508 may increase the number of the search results that correspond to the designated domain for the specified ngram that are to be provided in response to receipt of the search query to be the specified number in response to receiving the value identifier 516 from value determination logic 502.

In another example embodiment, step 208 includes limiting the number of the search results that correspond to the designated domain for the specified ngram that are to be provided in response to receipt of the search query to be no greater than a threshold number that is based on the click entropy for the specified ngram. In an example implementation, value determination logic 502 determines the threshold number based on the click entropy for the specified ngram. In accordance with this implementation, value determination logic 502 may include the threshold number in the value identifier 516. Result provision logic 508 may limit the number of the aforementioned search results to be no greater than the threshold number in response to receiving the value identifier 516 from value determination logic 502.

In some example embodiments, one or more steps 202, 204, 206, and/or 208 of flowchart 200 may not be performed. Moreover, steps in addition to or in lieu of steps 202, 204, 206, and/or 208 may be performed. For example, in an embodiment, the method of flowchart 200 includes grouping the search results that correspond to the designated domain for the specified ngram that are to be provided in response to receipt of the search query.

In an aspect of this embodiment, the aforementioned search results may be grouped to be consecutively ranked in a plurality of search results that is to be presented to a user that is associated with the search query. In accordance with this aspect, the method of flowchart 200 may include making a determination that the number of the search results that correspond to the designated domain for the specified ngram that are to be provided in response to receipt of the search query is greater than or equal to a threshold number. In further accordance with this aspect, the aforementioned search results may be grouped in response to the number of the aforementioned search results is greater than or equal to the threshold number. In an example implementation, grouping logic 510 groups the aforementioned search results from the provided search results 524 to be consecutively ranked in the grouped search results 526.

In another aspect, the aforementioned search results may be grouped to provide a group of consecutively listed search results. In accordance with this aspect, a highest ranking search result in the group may be listed above other search results in the group. In further accordance with this aspect, the other search results in the group may be indented with respect to the highest ranking search result in the group. In an example implementation, grouping logic 510 groups the aforementioned search results from the provided search results 524 to provide the group of consecutively listed search results in the grouped search results 526.

As shown in FIG. 3, the method of flowchart 300 begins at step 302. In step 302, for each ngram of a plurality of ngrams, a domain click value is determined that represents a proportion of clicks, which occur with respect to search queries that include the ngram, that corresponds to a designated domain. The domain click value for each ngram may be based on historical click data, though the scope of the example embodiments is not limited in this respect. The plurality of ngrams may include unigram(s), bigram(s), trigram(s), etc. or any combination thereof. In an example implementation, value determination logic 502 determines the domain click value for each ngram. In accordance with this implementation, value determination logic 502 may generate and/or provide a value identifier 516 that includes the domain click value for each ngram based on click information 514.

At step 304, the domain click value for each ngram is compared to a threshold value to determine a subset of the ngrams such that the domain click value of each ngram in the subset is greater than the threshold value. In an example implementation, comparison logic 504 compares the domain click value for each ngram to the threshold value to determine the subset of the ngrams. In accordance with this implementation, comparison logic 504 may generate and/or provide a subset identifier 518, which includes information regarding the subset. For example, the subset identifier 518 may identify the ngrams that are included in the subset. In another example, the subset identifier 518 may indicate the domain click values for the respective ngrams in the subset.

At step 306, a determination is made that each ngram in the subset is associated with an intent to access the designated domain based on the domain click value for each ngram in the subset being greater than the threshold value. The determination that each ngram in the subset is associated with the intent to access the designated domain may be implicitly made, though the scope of the example embodiments is not limited in this respect. In an example implementation, intent determination logic 506 determines that each ngram in the subset is associated with the intent to access the designated domain. In accordance with this implementation, intent determination logic 506 determines that the ngrams in the subset are associated with the intent based on the subset identifier 518.

In an example embodiment, the determination at step 306 is further based on at least one search result that corresponds to each ngram in the subset having a rank with respect to other search results that correspond to the ngram that is greater than or equal to a ranking threshold. A relatively greater rank of a search result that corresponds to an ngram corresponds to a relatively greater relevance of the search result with respect to a search query that includes the ngram. A relatively lesser rank of a search result that corresponds to an ngram corresponds to a relatively lesser relevance of the search result with respect to a search query that includes the ngram. In an aspect of this embodiment, the determination at step 306 may be further based on a number of the search results that correspond to each ngram in the subset that have a rank with respect to other search results that correspond to the ngram that is greater than or equal to the ranking threshold reaching a threshold number.

In another example embodiment, a determination is made that search queries that include an ngram from the subset are navigational with respect to the designated domain that corresponds to the ngram based on the ngram having a greater domain click value than other ngrams in the subset.

At step 308, a number of search results that correspond to (e.g., that are received from) the designated domain that are to be provided in response to receipt of a search query that includes a specified ngram from the subset is increased to be greater than a specified maximum number. For instance, the number of the aforementioned search results may be dynamically increased to be greater than the specified maximum number. The specified maximum number may be a predetermined maximum number, though the scope of the example embodiments is not limited in this respect. The specified ngram may be any suitable ngram from the subset. In an example implementation, result provision logic 508 increases a number of received search results 522 that correspond to the designated domain that are to be included in provided search results 524. For instance, result provision logic 508 may select the provided search results 524 from the received search results 522 to include more than the specified maximum number of search results that correspond to the designated domain for presentation to a user who initiates the search query.

In an example embodiment, step 308 includes increasing the number of the search results that correspond to the designated domain that are to be provided in response to receipt of the search query that includes the specified ngram to be a specified number that is selected based on the domain click value for the specified ngram. In another example embodiment, step 308 includes limiting the number of the aforementioned search results to be no greater than a threshold number that is based on the domain click value for the specified ngram.

In some example embodiments, one or more steps 302, 304, 306, and/or 308 of flowchart 300 may not be performed. Moreover, steps in addition to or in lieu of steps 302, 304, 306, and/or 308 may be performed. For instance, in an example embodiment, step 302 includes determining, for each ngram, a domain click value that represents a proportion of clicks, which occur with respect to search queries that include the ngram, that corresponds to each of a plurality of domains. The plurality of domains includes the designated domain. In accordance with this embodiment, the method of flowchart 300 includes, for each ngram, summing intermediate values that are based on the respective domain click values for the ngram to provide a click entropy for that ngram. In further accordance with this embodiment, the method of flowchart 300 includes comparing the click entropy for each ngram to an entropy threshold to determine a subset of the click entropies. Each click entropy in the subset has an absolute value that is less than the entropy threshold. In still further accordance with this embodiment, the number of the search results is increased at step 308 further based on the click entropy of the specified ngram being included in the subset of the click entropies.

In an aspect of the aforementioned embodiment, for each ngram, a logarithmic operation may be performed with respect to each domain click value that corresponds to the ngram to provide the respective intermediate value. For instance, an intermediate value for an ngram may be represented by the following equation:

$$IV = -D * \log_2(D) \qquad \text{Equation 3}$$

where IV represents the intermediate value for the ngram, and D represents a domain click value for the corresponding domain. In an example implementation, value determination logic 502 sums the intermediate values for each ngram to generate the respective click entropy.

In another example embodiment, the method of flowchart 300 includes grouping the search results that correspond to the designated domain for the specified ngram that are to be provided in response to receipt of the search query. In an aspect of this embodiment, the aforementioned search results may be grouped to be consecutively ranked in a plurality of search results that is to be presented to a user that is associated with the search query. In accordance with this aspect, a determination may be made that the number of the aforementioned search results is greater than or equal to a threshold number. In further accordance with this aspect, the aforementioned search results may be grouped in response to determining that the number of the aforementioned search results is greater than or equal to the threshold number. In another aspect, the aforementioned search results may be grouped to provide a group of consecutively listed search results. In accordance with this aspect, a highest ranking search result in the group may be listed above other search results in the group. In further accordance with this aspect, the other search results in the group may be indented with respect to the highest ranking search result in the group. In an example implementation, grouping logic 510 groups the aforementioned search results.

As shown in FIG. 4, the method of flowchart 400 begins at step 402. In step 402, a rule is established that specifies a maximum number of search results that are to be provided from each of a plurality of domains in response to an arbitrary search query. In an example implementation, rule logic 512 establishes rule 528 to specify the maximum number of received search results 522 that are to be included in provided search results 524 from each of the plurality of domains in response to an arbitrary search query.

At step 404, a number of search results that are to be provided from a specified domain of the plurality of domains in response to a specified search query is dynamically increased to be greater than the maximum number based on the specified search query including an ngram that is identified to be associated with an intent to access the specified domain. In an example implementation, result provision logic 508 dynamically increases the number of the received search results 522 from the specified domain that are to be included, in provided, search results 524 in response to the specified search query to be greater than the maximum number based on the specified search query including an ngram that is identified to be associated with an intent to access the specified domain.

At step 406, one or more of the search results that are to be provided from the specified domain are re-ranked such that the search results that are to be provided from the specified domain are consecutively ranked in a plurality of search results that is to be presented to a user that is associated with the specified search query. In an example implementation, grouping logic 510 re-ranks one or more of the search results that are to be provided from the specified domain in the provided search results 524 to provide grouped search results 526. In accordance with this implementation, grouping logic 510 provides the grouped search results 526 such that the search results that are to be provided from the specified domain are consecutively ranked therein.

In some example embodiments, one or more steps 402, 404, and/or 406 of flowchart 400 may not be performed. Moreover, steps in addition to or in lieu of steps 402, 404, and/or 406 may be performed. For example, in an embodiment, the method of flowchart 400 includes making a determination that a click entropy associated with the ngram that is identified to be associated with the intent to access the specified domain is less than an entropy threshold. The click entropy represents an extent to which clicks that occur with respect to search queries that include the ngram is diversified among the plurality of domains. In accordance with this embodiment, the number of the search results that are to be provided from the specified domain in response to the specified search query is dynamically increased at step 404 to be greater than the maximum number based on the click entropy that is associated with the ngram being less than the entropy threshold. In an example implementation, comparison logic 504 determines that the click entropy that is associated with the ngram is less than the entropy threshold, in accordance with this implementation, comparison logic 504 may provide an increasing instruction directly or indirectly to result provision logic 508 that instructs result provision logic 508 to dynamically increase the number of the aforementioned search results to be greater than the maximum number in response to a determination that the click entropy that is associated with the ngram is less than the entropy threshold.

In another example embodiment, the method of flowchart 400 includes making a determination that a domain click value that is associated with the ngram is greater than a threshold value. The domain click value represents a proportion of clicks that occur with respect to search queries that include the ngram that corresponds to the specified domain. In accordance with this embodiment, the number of the aforementioned search results is dynamically increased at step 404 to be greater than the maximum number based on the domain click value being greater than the threshold value. In an example implementation, comparison logic 504 determines that the domain click value that is associated with the ngram is greater than the threshold value. In accordance with this implementation, comparison logic 504 may provide an increasing instruction directly or indirectly to result provision logic 508 that instructs result provision logic 508 to dynamically increase the number of the aforementioned search results to be greater than the maximum number in response to a determination that the domain click value that is associated with the ngram is greater than the threshold value.

In yet another example embodiment, the method of flowchart 400 includes making a determination that the number of the aforementioned search results is greater than or equal to a threshold number. In accordance with this embodiment, the one or more of the aforementioned search results are re-ranked at step 406 based on the number of the aforementioned search results being greater than or equal to the threshold number. In an example implementation, comparison logic 504 determines that the number of the aforementioned search results is greater than or equal to the threshold number. In accordance with this implementation, comparison logic 504 may provide a re-ranking instruction directly or indirectly to grouping logic 510 that instructs grouping logic 510 to re-rank the one or more of the aforementioned search results.

It will be recognized that implicit intent logic 500 may not include one or more of value determination logic 502, comparison logic 504, intent determination logic 506, result provision logic 508, grouping logic 510, and/or rule logic 512. Furthermore, implicit intent logic 500 may include logic in addition to or in lieu of value determination logic 502, comparison logic 504, intent determination logic 506, result provision logic 508, grouping logic 510, and/or rule logic 512.

Search engine module 108, implicit intent logic 110, value determination logic 502, comparison logic 504, intent determination logic 506, result provision logic 508, grouping logic 510, and rule logic 512 may be implemented in hardware, software, firmware, or any combination thereof.

For example, search engine module 108, implicit intent logic 110, value determination logic 502, comparison logic 504, intent determination logic 506, result provision logic 508, grouping logic 510, and/or rule logic 512 may be implemented as computer program code configured to be executed in one or more processors.

In another example, search engine module 108, implicit intent logic 110, value determination logic 502, comparison logic 504, intent determination logic 506, result provision logic 508, grouping logic 510, and/or rule logic 512 may be implemented as hardware logic/electrical circuitry. For instance, in an embodiment, one or more of search engine module 108, implicit intent logic 110, value determination logic 502, comparison logic 504, intent determination logic 506, result provision logic 508, grouping logic 510, rule logic 512, flowchart 200, flowchart 300, and/or flowchart 400 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
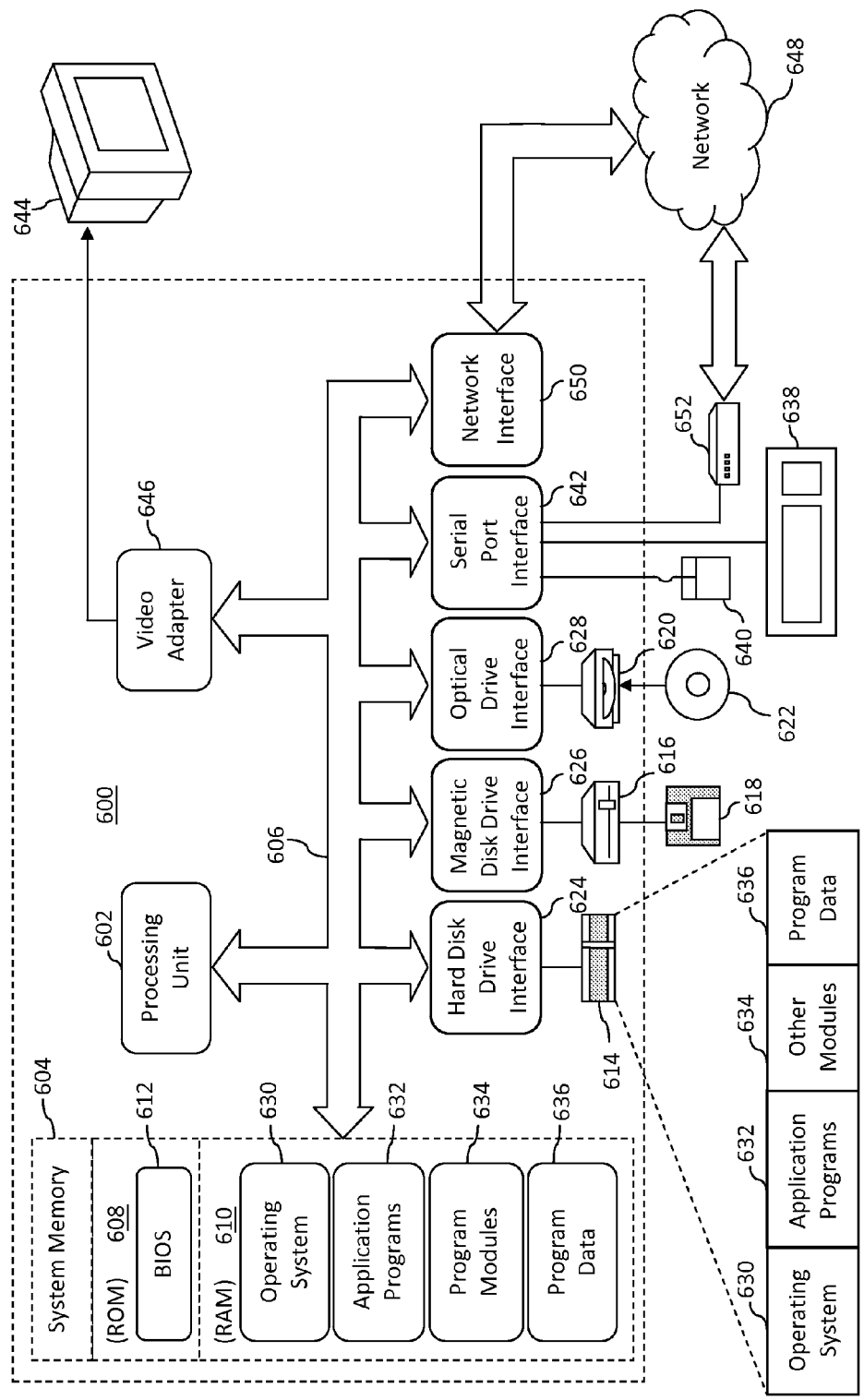
FIG. 6 depicts an example computer in which embodiments may be implemented.

FIG. 6 depicts an example computer 600 in which embodiments may be implemented. Any one or more of the user systems 102A-102M or the servers 106A-106N shown in FIG. 1 (or any one or more subcomponents thereof shown in FIG. 5) may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processing unit 602, a system memory 604, and a bus 606 that couples various system components including system memory 604 to processing unit 602. Bus 606 represents one or more of any of several types of bus structures, including a memory bus or memory controller, a peripheral bus, an accelerated, graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing search engine module 108, implicit intent logic 110, value determination logic 502, comparison logic 504, intent determination logic 506, result provision logic 508, grouping logic 510, rule logic 512, flowchart 200 (including any step of flowchart 200), flowchart 300 (including any step of flowchart 300), and/or flowchart 400 (including any step of flowchart 400), as described herein.

A user may enter commands and information into the computer 600 through input devices such as keyboard 638 and pointing device 640. Other input devices (not shown) may include a microphone, joystick, game pad, satellite dish, scanner, or the like. These and other input devices are often connected to the processing unit 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable medium" are used to generally refer to media such as the hard disk associated with hard disk drive 614, removable magnetic disk 618, removable optical disk 622, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
for each ngram of a plurality of ngrams, determining a click entropy that represents an extent to which a plurality of clicks that occurs with respect to a plurality of search queries that include the ngram is diversified among a plurality of domains based on a proportion of the plurality of clicks that corresponds to each domain of the plurality of domains;
comparing the click entropy for each ngram to an entropy threshold to determine a subset of the plurality of ngrams such that the click entropy of each ngram in the subset is less than the entropy threshold;

determining that each ngram in the subset is associated with an intent to access a respective designated domain of the plurality of domains, the designated domain for each ngram in the subset corresponding to a relatively greater proportion of the plurality of clicks that occurs with respect to the plurality of search queries that include that ngram than others of the plurality of domains; and increasing a number of search results that correspond to the designated domain for a specified ngram from the subset that are to be provided in response to receipt of a search query that includes the specified ngram to be greater than a specified maximum number, using at least one processor, based on the specified ngram being associated with the intent to access the designated domain for the specified ngram.

2. The method of claim 1, wherein the click entropy for each ngram is based on a summation of values for that ngram, each value being based on a logarithmic function of the respective proportion of the plurality of clicks that occurs with respect to the plurality of search queries that include the ngram that corresponds to the respective domain.

3. The method of claim 1, wherein increasing the number of the search results that correspond to the designated domain for the specified ngram that are to be provided in response to receipt of the search query comprises:

increasing the number of the search results that correspond to the designated domain for the specified ngram that are to be provided in response to receipt of the search query to be a specified number that is selected based on the click entropy for the specified ngram.

4. The method of claim 1, wherein increasing the number of the search results that correspond to the designated domain for the specified ngram that are to be provided in response to receipt of the search query comprises:

limiting the number of the search results that correspond to the designated domain for the specified ngram that are to be provided in response to receipt of the search query to be no greater than a threshold number that is based on the click entropy for the specified ngram.

5. The method of claim 1, further comprising:

grouping the search results that correspond to the designated domain for the specified ngram that are to be provided in response to receipt of the search query to be consecutively ranked in a plurality of search results that is to be presented to a user that is associated with the search query.

6. The method of claim 5, further comprising:

determining that the number of the search results that correspond to the designated domain for the specified ngram that are to be provided in response to receipt of the search query is greater than or equal to a threshold number;

wherein grouping the search results that correspond to the designated domain for the specified ngram that are to be provided in response to receipt of the search query comprises:

grouping the search results that correspond to the designated domain for the specified ngram that are to be provided in response to receipt of the search query in response to determining that the number of the search results that correspond to the designated domain for the specified ngram that are to be provided in response to receipt of the search query is greater than or equal to a threshold number.

7. The method of claim 1, further comprising:

grouping the search results that correspond to the designated domain for the specified ngram that are to be provided in response to receipt of the search query to provide a group of consecutively listed search results, a highest ranking search result in the group being listed above other search results in the group, the other search results in the group being indented with respect to the highest ranking search result in the group.

8. A method comprising:

for each ngram of a plurality of ngrams, determining a domain click value that represents a proportion of a plurality of clicks, which occur with respect to a plurality of search queries that include the ngram, that corresponds to a designated domain;

comparing the domain click value for each ngram to a threshold value to determine a subset of the plurality of ngrams such that the domain click value of each ngram in the subset is greater than the threshold value;

determining that each ngram in the subset is associated with an intent to access the designated domain based on the domain click value for each ngram in the subset being greater than the threshold value; and increasing a number of search results that correspond to the designated domain that are to be provided in response to receipt of a search query that includes a specified ngram from the subset to be greater than a specified maximum number, using at least one processor, based on the specified ngram being associated with the intent to access the designated domain.

9. The method of claim 8, wherein determining the domain click value for each ngram comprises:

for each ngram, determining a domain click value that represents a proportion of a plurality of clicks, which occur with respect to a plurality of search queries that include the ngram, that corresponds to each of a plurality of domains, the plurality of domains including the designated domain;

wherein the method further comprises:

for each ngram, summing intermediate values that are based on the respective domain click values for the ngram to provide a click entropy for that ngram; and comparing the click entropy for each ngram to an entropy threshold to determine a subset of the click entropies, each click entropy in the subset having an absolute value that is less than the entropy threshold;

wherein increasing the number of the search results comprises:

increasing the number of the search results further based on the click entropy of the specified ngram being included in the subset of the click entropies.

10. The method of claim 9, further comprising:

for each ngram, performing a logarithmic operation with respect to each domain click value that corresponds to the ngram to provide the respective intermediate value.

11. The method of claim 8, wherein increasing the number of the search results that correspond to the designated domain that are to be provided in response to receipt of the search query comprises:

increasing the number of the search results that correspond to the designated domain that are to be provided in response to receipt of the search query to be a specified number that is selected based on the domain click value for the specified ngram.

12. The method of claim 8, wherein increasing the number of the search results that correspond to the designated domain that are to be provided in response to receipt of the search query comprises:
- limiting the number of the search results that correspond to the designated domain that are to be provided in response to receipt of the search query to be no greater than a threshold number that is based on the domain click value for the specified ngram.

13. The method of claim 8, further comprising:
- grouping the search results that correspond to the designated domain that are to be provided in response to receipt of the search query to be consecutively ranked in a plurality of search results that is to be presented to a user that is associated with the search query.

14. The method of claim 13, further comprising:
- determining that the number of the search results that correspond to the designated domain that are to be provided in response to receipt of the search query is greater than or equal to a threshold number;
- wherein grouping the search results that correspond to the designated domain that are to be provided in response to receipt of the search query comprises:
  - grouping the search results that correspond to the designated domain that are to be provided in response to receipt of the search query in response to determining that the number of the search results that correspond to the designated domain that are to be provided in response to receipt of the search query is greater than or equal to the threshold number.

15. The method of claim 8, further comprising:
- grouping the search results that correspond to the designated domain that are to be provided in response to receipt of the search query to provide a group of consecutively listed search results, a highest ranking search result in the group being listed above other search results in the group, the other search results in the group being indented with respect to the highest ranking search result in the group.

16. A method comprising:
- establishing a rule that specifies a maximum number of search results that are to be provided from each of a plurality of domains in response to an arbitrary search query;
- determining that at least one of a click entropy associated with an ngram is less than an entropy threshold or a domain click value associated with the ngram is greater than a threshold value,
  - the ngram identified to be associated with an intent to access a specified domain of the plurality of domains,
  - the click entropy representing an extent to which a plurality of clicks that occurs with respect to a plurality of search queries that include the ngram is diversified among the plurality of domains,
  - the domain click value representing a proportion of the plurality of clicks that occurs with respect to the plurality of search queries that include the ngram that corresponds to the specified domain; and
- dynamically increasing a number of search results that are to be provided from the specified domain in response to a specified search query to be greater than the maximum number, using at least one processor, based on the specified search query including the ngram and further based on at least one of the click entropy being less than the entropy threshold or the domain click value being greater than the threshold value.

17. The method of claim 16, further comprising:
- re-ranking one or more of the search results that are to be provided from the specified domain such that the search results that are to be provided from the specified domain are consecutively ranked in a plurality of search results that is to be presented to a user that is associated with the specified search query.

18. The method of claim 17, further comprising:
- determining that the number of the search results that are to be provided from the specified domain in response to the specified search query is greater than or equal to a threshold number;
- wherein re-ranking the one or more of the search results that are to be provided from the specified domain comprises:
  - re-ranking the one or more of the search results that are to be provided from the specified domain based on the number of the search results that are to be provided from the specified domain in response to the specified search query being greater than or equal to the threshold number.

19. The method of claim 16, wherein dynamically increasing the number of the search results that are to be provided from the specified domain in response to the specified search query comprises:
- limiting the number of the search results that are to be provided from the specified domain in response to the specified search query to be no greater than a threshold number that is based on the click entropy associated with the ngram.

20. The method of claim 16, wherein dynamically increasing the number of the search results that are to be provided from the specified domain in response to the specified search query comprises:
- limiting the number of the search results that are to be provided from the specified domain in response to the specified search query to be no greater than a threshold number that is based on the domain click value associated with the ngram.

* * * * *